Sept. 9, 1924.
W. T. CAVENDER
1,507,986
ROTARY WELL DRILLING MACHINE
Filed Dec. 21, 1921    2 Sheets-Sheet 2
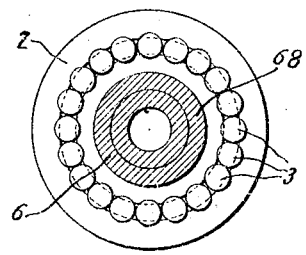
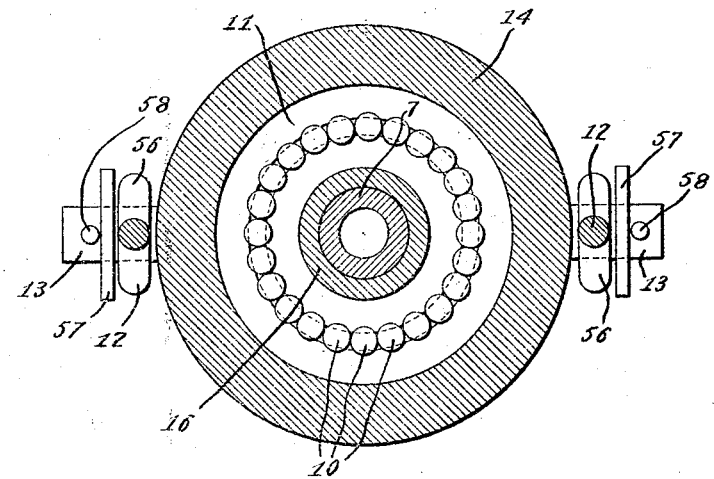

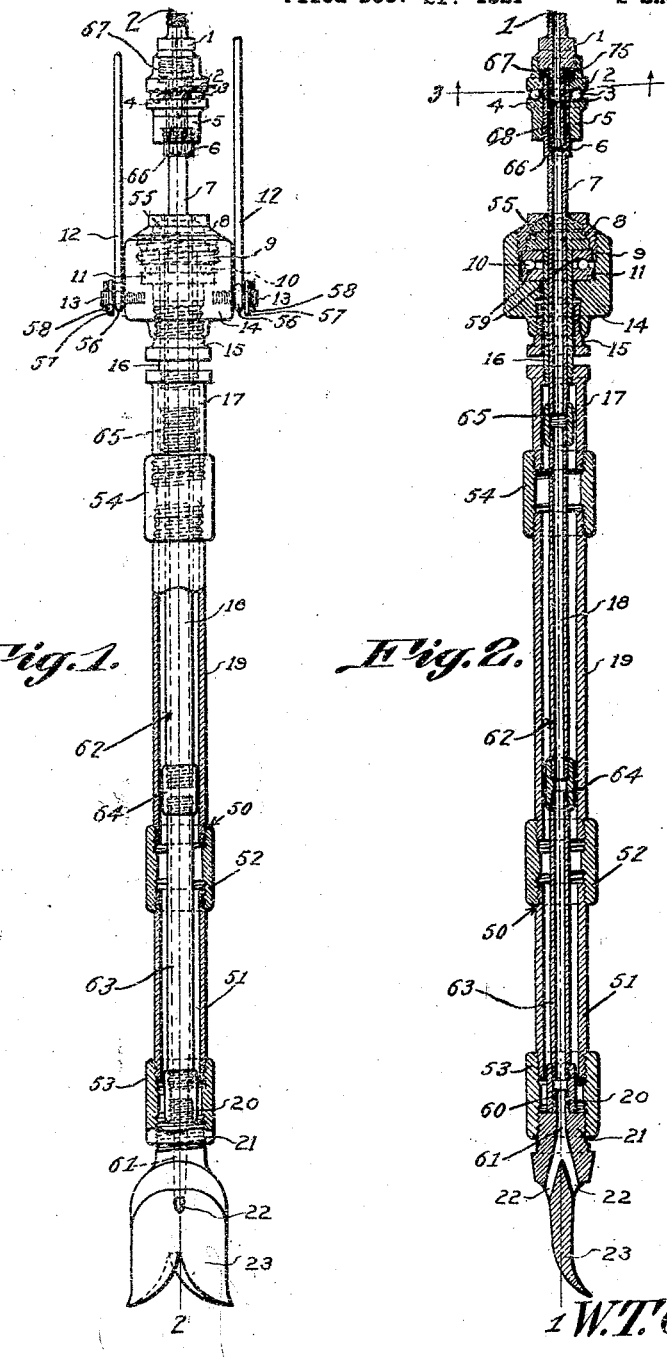

Patented Sept. 9, 1924.

1,507,986

UNITED STATES PATENT OFFICE.

WALKER TULLY CAVENDER, OF SABINAL, TEXAS.

ROTARY WELL-DRILLING MACHINE.

Application filed December 21, 1921. Serial No. 523,955.

*To all whom it may concern:*

Be it known that I, WALKER TULLY CAVENDER, a citizen of the United States, residing at Sabinal, in the county of Uvalde and State of Texas, have invented a new and useful Rotary Well-Drilling Machine, of which the following is a specification.

By way of explanation, it may be stated that the lower end of a drill stem, twists off, the result being that the drill is lost, the supply of water to the drill continuing, and a caving-in of the drill hole resulting.

The foregoing being understood, it may be stated that it is the object of this invention to provide means whereby the operator will be notified, as soon as the drill stem twists off, it being possible to cut off the supply of water to the drill, the device including interengaging parts whereby the entire device may be lifted out of the hole, notwithstanding the fact that the lower end of the drill stem has been broken off from the upper portion of the drill stem.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention, parts being broken away to the line 1—1 in Figure 2; Figure 2 is a longitudinal section on the line 2—2 of Figure 1; Figure 3 is a cross section on the line 3—3 of Figure 2; and Figure 4 is a transverse section taken through the carrier and adjacent parts.

In carrying out the invention there is provided a drill stem denoted generally by the numeral 50, the stem including a pipe 19 and a pipe 51 connected by a coupling 52, a coupling 53 being mounted on the lower end of the pipe 51. A coupling 54 unites the pipe 19 with a thimble 17. The lower end of a tube 16 is threaded into the upper end of the thimble 17 and is provided at its upper end with an enlarged head 55.

The numeral 14 denotes a collar or carrier having lateral projections 13 receiving eyes 56 on a suspension member 12, the eyes being held on the projections by washers 57 and retainers 58. A nut 8 is threaded into the upper end of the collar or carrier 14 and cooperates with the head 55 of the tube 16. An upper race member 9 is located within the nut 8, a lower race member 11 being disposed in the carrier 14, the tube 16 passing through the race members, and the race members being supplied with races 59 receiving balls 10. The construction, obviously, is such that the drill stem 50, considered as an entity, is journaled in the carrier 14. A packing nut 15 is threaded into the lower end of the carrier 14, and the tube 16 passes through the packing nut.

The numeral 23 marks a drill having a reduced neck 21, threaded into the coupling 53, the neck terminating in a reduced stem 60 located within the said coupling. The drill 23 has a bore 61, located, in part, in the stem 60, and dividing at its lower end into branches 22 discharging on the outer surface of the drill 23.

The device includes a water conduit, designated generally by the numeral 62 and located in the drill stem 50. The water conduit 62 includes a coupling 20 threaded or secured otherwise to the stem 60 of the drill 23, the coupling being connected to a pipe 63, united by a coupling 64 to a pipe 18, connected by a coupling 65 to a pipe 7 which extends upwardly through the tube 16 and its head 55, and through the nut 8, the pipe 7 having an enlarged upper portion 6 defining a shoulder 66.

The numeral 67 denotes a collar into which a tip 1 is threaded, the collar and the tip constituting a coupling, wherewith a water supply tube, (not shown) may be assembled. A packing 75 is compressed in the collar 67 by the tip 1, and, thus, a stuffing box is formed, leakage about the balls 3 (hereinafter described) being prevented. At its lower end, the collar 67 is provided with a ball race 2, the upper end of the part 6 of the pipe 7 being journaled in the collar. A nut 5 is threaded on the part 6 of the pipe 7 and carries a ball race 4. Balls 3 are interposed between the races 2 and 4. The tip 1 has a reduced neck 68 extended downwardly into the part 6 of the pipe 7.

A reciprocating movement may be imparted to the collar or carrier 14, by way of the suspension member 12, the drill stem 50 rotating in the carrier, in a common and well known manner. When the drill stem 50 rotates, the water conduit 62 will rotate likewise, because the water conduit is connected at its lower end to the drill 23, the drill being carried by the drill stem 50. The water conduit 62 rotates in the coupling 1—2 and so long as the operator can see the nut 5 rotating, he is advised that the lower end portion of the drill stem 50 is intact, and that the lower end of the stem, carrying the drill 23, has not been twisted off. When, however, the lower end of the drill stem 50 is broken, and remains fixed against rotation in the ground, the water conduit 62 no longer rotates with respect to the coupling 1—2, and when the operator notes that the upper end of the water conduit is not rotating, he is at once made aware of the fact that the lower end of the drill stem 50 has been broken. Thereupon, the carrier 14 may be raised, by means of the suspension member 12, until the nut 8 abuts against the shoulder 66, the entire tool being lifted out of the well.

Not only may the drill and the severed portion of the drill stem be saved, but, further, the operator can turn off the water, and prevent a washing out and caving-in of the drill hole, the appropriate time for turning off the water being made manifest when the water conduit 62 no longer rotates at its upper end.

What is claimed is:—

1. In a device of the class described, a tubular drill stem; a carrier wherein the stem is rotatable; a drill carried by the drill stem; a coupling; and a water conduit rotatable in the coupling and located in the stem, the conduit being connected to the drill independently of the stem, whereby when the stem breaks, the conduit will cease to rotate in the coupling, thereby notifying an operator of the breaking of the stem.

2. A device of the class described, constructed as set forth in claim 1 and further characterized by the fact that the conduit and the carrier have parts which interengage to effect a lifting of the drill at the lower end of the stem, after the stem is broken, and when the carrier is lifted.

In testimony that I claim the foregoing as my own, I have hereto affixed my signature in the presence of two witnesses.

WALKER TULLY CAVENDER.

Witnesses:
HUBERT W. PETERS,
ALBERT R. RACER.